(12) United States Patent
Bustos Robledo

(10) Patent No.: US 11,319,637 B2
(45) Date of Patent: May 3, 2022

(54) SYSTEM FOR SUPERIMPOSING AC ON DC IN ELECTROLYTIC PROCESSES

(71) Applicant: THOR SPA, Santiago (CL)

(72) Inventor: Juan Pablo Bustos Robledo, Santiago (CL)

(73) Assignee: Thor Spa, Santiago (CL)

( * ) Notice: Subject to any disclaimer, the term of this patent is extended or adjusted under 35 U.S.C. 154(b) by 84 days.

(21) Appl. No.: 16/962,168

(22) PCT Filed: Jan. 15, 2019

(86) PCT No.: PCT/CL2019/050006
§ 371 (c)(1),
(2) Date: Jul. 14, 2020

(87) PCT Pub. No.: WO2019/136570
PCT Pub. Date: Jul. 18, 2019

(65) Prior Publication Data
US 2020/0340131 A1 Oct. 29, 2020

(30) Foreign Application Priority Data
Jan. 15, 2018 (CL) .................................. 114-2018

(51) Int. Cl.
*C25C 1/12* (2006.01)
*C25C 7/02* (2006.01)
*C25C 7/06* (2006.01)
(52) U.S. Cl.
CPC .............. *C25C 1/12* (2013.01); *C25C 7/02* (2013.01); *C25C 7/06* (2013.01)

(58) Field of Classification Search
CPC ...................................................... C25C 7/02
See application file for complete search history.

(56) References Cited

U.S. PATENT DOCUMENTS

| 3,535,218 A * | 10/1970 | Brown ...................... C25C 1/12 205/341 |
| 3,717,568 A * | 2/1973 | Brown ...................... C25C 1/12 204/229.5 |
| 4,159,231 A * | 6/1979 | Smith ..................... C25D 5/605 205/107 |
| 8,580,089 B2 | 11/2013 | Lagos Lehuede et al. |
| 2002/0025763 A1* | 2/2002 | Lee ....................... B24B 37/042 451/41 |

(Continued)

FOREIGN PATENT DOCUMENTS

| EP | 3072993 | 9/2016 | | |
| WO | WO 2011/123896 A1 * | 10/2011 | ............... | C25C 7/06 |
| WO | WO 2016/063207 A1 * | 4/2016 | ............... | C25C 7/06 |

OTHER PUBLICATIONS

PCT Application No. PCT/CL2019/050006, International Search Report and Written Opinion dated May 8, 2019, 11 pages.

*Primary Examiner* — Harry D Wilkins, III
(74) *Attorney, Agent, or Firm* — Kilpatrick Townsend & Stockton LLP

(57) ABSTRACT

The present invention relates to a system for superimposing alternating current on direct current flowing through one or more electrolytic cells, for electro-winning or electro-refining processes, in which the terminals of an alternating current source are connected to the first and last electrode of a cell or a group of cells.

10 Claims, 5 Drawing Sheets

(56) References Cited

U.S. PATENT DOCUMENTS

| | | | |
|---|---|---|---|
| 2004/0200731 A1* | 10/2004 | Sullivan | H01M 10/44 205/628 |
| 2007/0125659 A1* | 6/2007 | Hecker Cartes | C25C 1/12 205/341 |
| 2012/0067719 A1* | 3/2012 | Lagos Lehuede | C25C 1/00 204/229.4 |
| 2016/0355938 A1* | 12/2016 | Bustos Robledo | C25C 7/06 |
| 2018/0019496 A1* | 1/2018 | Konopka | C07D 233/58 |

* cited by examiner

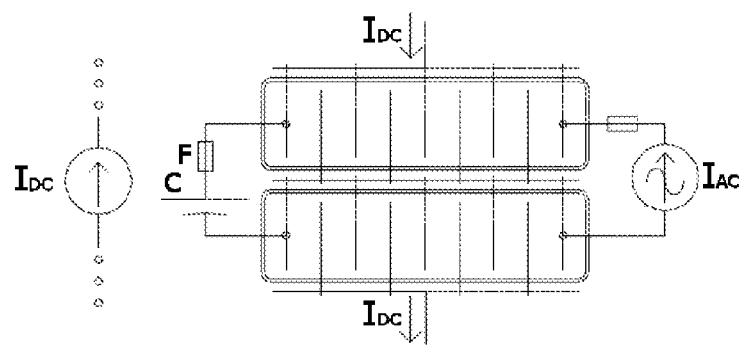
Figure #1
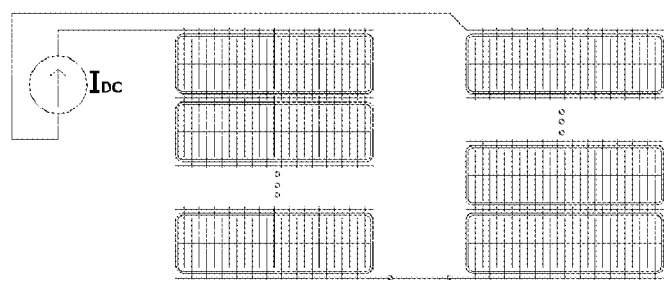
Figure #2
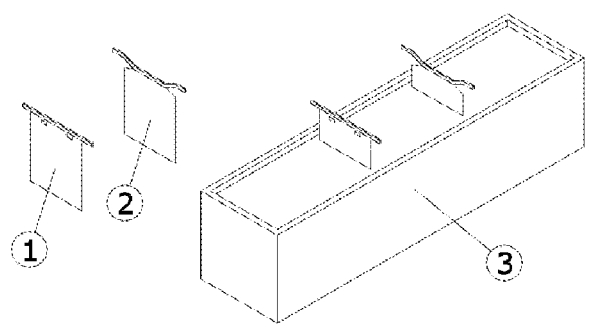
Figure #3

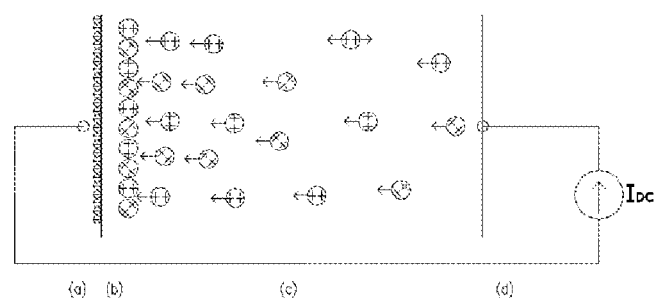
Figure #4
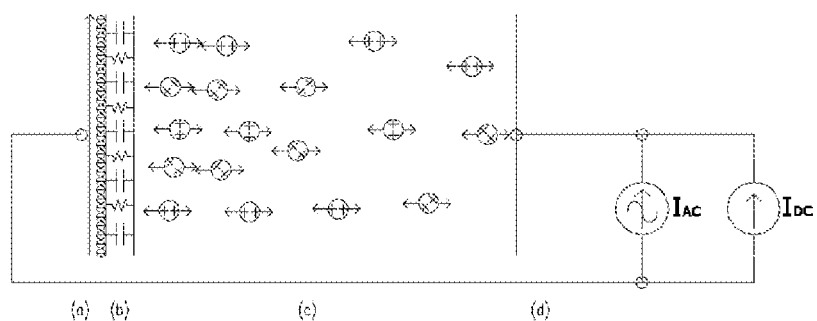
Figure #5

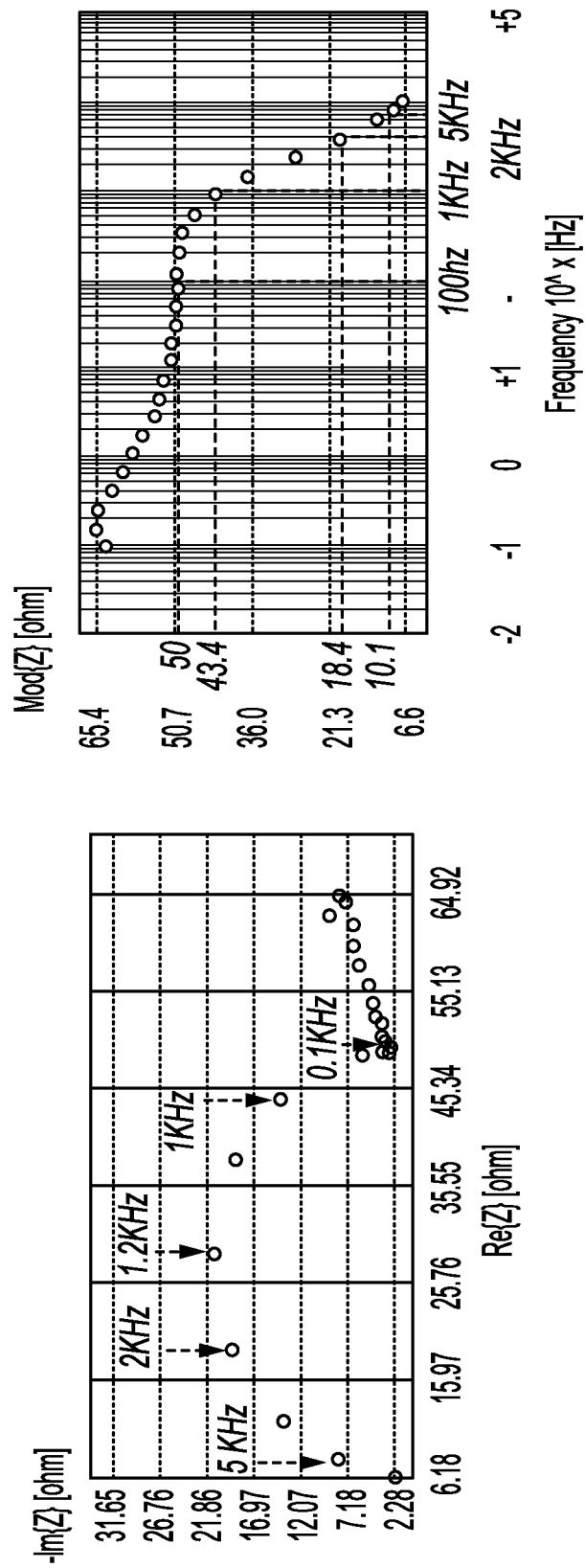
Figure #6

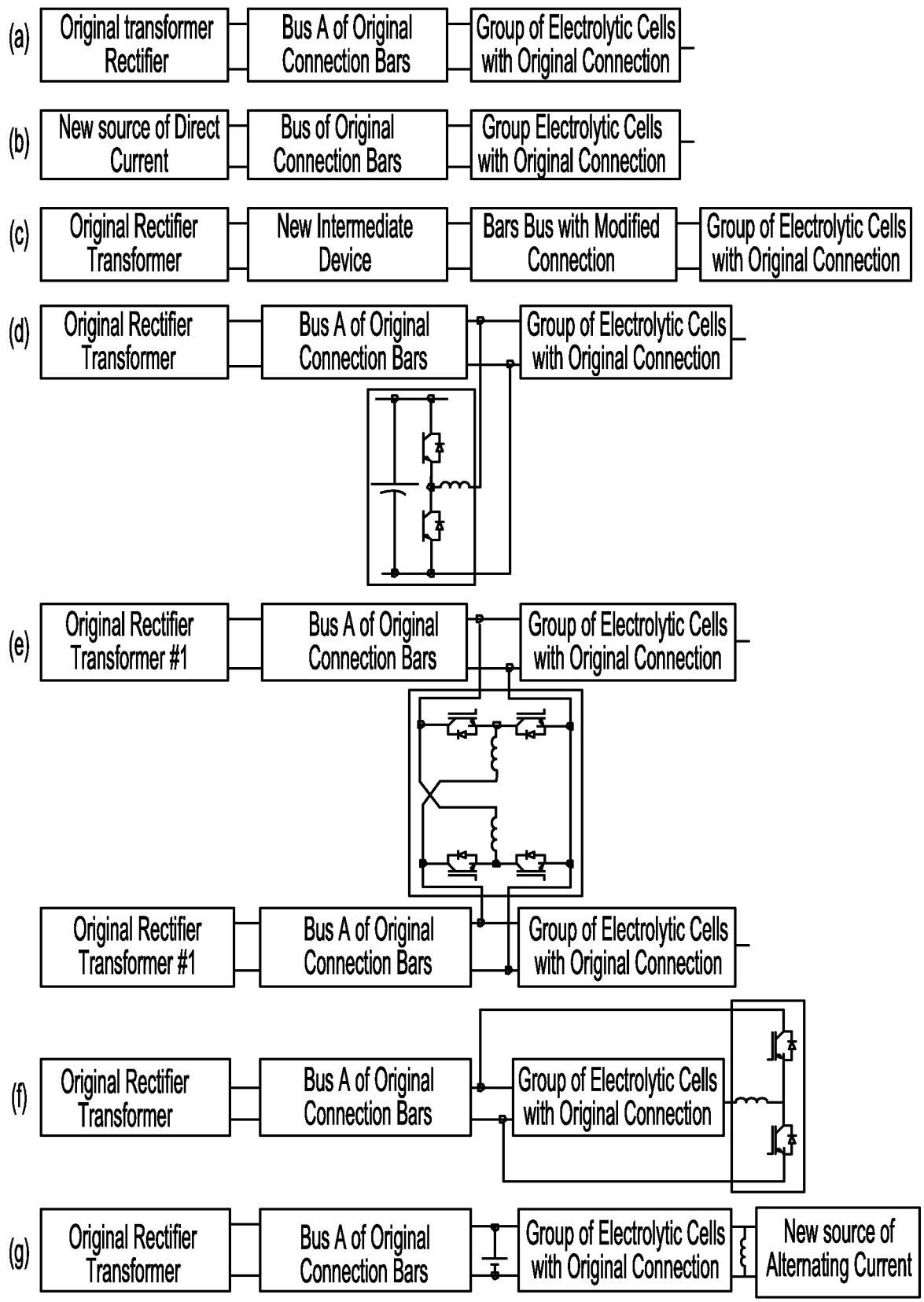
Figure #7

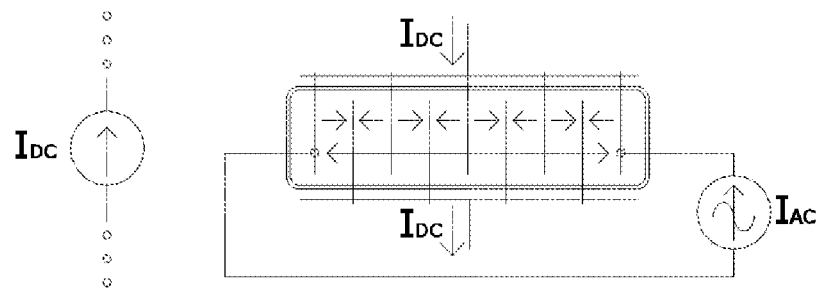
Figure #8
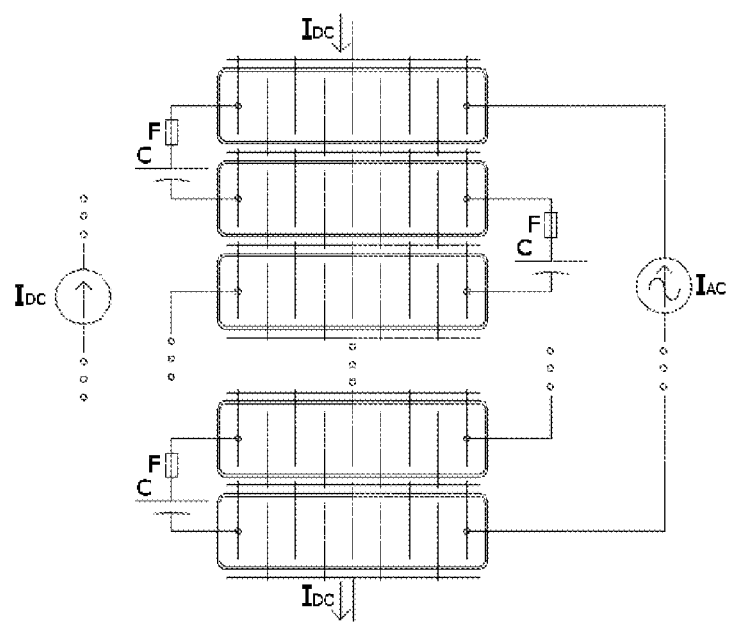
Figure #9

SYSTEM FOR SUPERIMPOSING AC ON DC IN ELECTROLYTIC PROCESSES

TECHNICAL PROBLEM

Copper business uses electric current rectifiers for producing electrolytic copper from copper dissolved in the circulating electrolyte inside the electrolytic cells for both electrowinning (EW) and electrolytic refining of copper (ER) (FIG. 2). Rectifiers generate direct electric current which allows settling of the copper dissolved in the electrolyte and bonds to the surface of the cathode, which according to Faraday's Law, is proportional to the current, thus obtaining a highly pure metal copper bonded onto cathodes. Cathodes are usually stainless steel plates sowed with no copper. Later, after a settling period, they are harvested with a copper layer bonded on both faces.

The circulating electrolyte is mainly made up of water and sulphuric acid, with an approximate proportion of 180 [gr/lt]. The copper dissolved in the electrolyte is usually found in a proportion of 30 to 50 [gr/lt]. During the EW process, dissolved copper penetrates the electrolytic cells through a piping system which interconnects the EW process with the previous production stages of solvent extraction and minerals leaching or other elements containing copper. On the other hand, during ER process, copper is obtained by dissolving impure copper anodes, coming from the previous stages of concentration and smelting.

The electrolytic cells look like rectangular-based containers. These have a depth such that some electrodes can be inserted inside in order to generate the electrolytic process. These are almost fully submerged in the circulating electrolyte (FIG. 3). In the EW process the electrodes (anodes and cathodes) are alternate inserted, so there will always be a cathode between two anodes. Therefore, in the EW processes, the first and the last electrode will always be anodes. On the contrary, the goal of the ER processes is to dissolve the anodes coming from the smelting process. The electrodes (anode and cathodes), are alternate inserted, so there will always be an anode between two cathodes. Thereby, in the ER processes, the first and the last electrode are always cathodes.

Copper deposition process, both for EW an ER has some restrictions in terms of capacity for copper deposition in the cathode. It is well known that arbitrary increase of the current density in the electrodes deteriorates chemical/physical features of the copper deposited. Currently, at some industrial facilities the process uses current density of nearly 200 to 450 [A/m$^2$]. If this level is raised, an increasing production is obtained, but at the expense of a severe quality deterioration of the copper produced. During regular Electrowinning (EW) and Electrorefining (ER) processes, the control variables of the metallurgical process are as follows: copper concentration, flow and temperature of the electrolyte. Temperature increase improves local mobility of the ions. On the other hand, flow and concentration increase availability of ions aimed to react in the electrode-electrolyte interface.

Industrial EW Plants producing copper with a density higher than 300 [A/m2] that keep good physical/chemical features of the deposit, operate at a temperature higher than 45 [° C.], with high surface flow of nearly 2.2 [lt/min/m2] and copper concentrations higher than 45 [gr/lt]. The aforementioned leads to a high operational cost, which is reasonable if the international value of the copper is high; however, in medium/low copper value scenarios, a high operational cost is critical for the operational continuity of the plant.

In case of copper ER Plants, current density is even more restricted due to anodic passivation, therefore usually the process is performed with current density lower than 320 [A/m2]. Even so the operation must operate at a temperature above 60 [° C.] in order to maintain quality of the deposit. Flow is not a variable available at the ER Plants either, as an increasing flow produces agitation of the anodic slurry, thus polluting the lower portion of the manufactured cathodes.

Even though, neither the comprehensive study of the electroplating phenomenon nor the phenomena produced in the electrode-electrolyte interface, named as "doble electrochemical layer" are our goals, it is necessary to mention that in the modeling of the double electrochemical layer, just as its name says, there are two perfectly differentiated layers of electrolyte, which have a different behavior: the inner layer or Helmholtz layer and the outer layer or diffuse layer. Inside the Helmholtz layer, the complex phenomenon of copper transformation into a metal copper solution occurs. Due to the high accumulation of ions, placed so close from each other, "waiting" to be deposited, and with no power enough to reduce themselves, the Helmholtz layer can be easily modeled as a capacitor made up of a metal plate (the electrode) and another non metal plate, which is the high ions concentration in the electrolyte, connected in parallel with a resistive impedance representing all power consumption necessary to turn dissolved copper ions into atoms in the metal crystal structure of the cathode (copper reduction) (FIG. 4).

On the other hand, the diffuse layer is characterized by a high concentration of copper ions and protons which varies from the vicinity of the Helmholtz layer, to the typical concentration of the solution core. Discarding the Helmholtz layer, from the diffuse layer to the solution core, some ions transportation phenomena occur, such as: migration, caused by the electric field applied and dissemination, because of the concentration variations. Currently there are various technologies aimed to improve these transportation phenomena, such as: "air sparging". It consists of injecting air into the electrolyte, thus getting hydrodynamic improvement in the vicinity of the electrodes, and therefore improving the quality of the copper. The effect of this type of technology is limited by the electrolyte viscosity, which is an electrostatic phenomenon preventing that mechanical agitation exerted from the electrolyte onto the electrodes gets closer to the reaction spot, i.e. the double electrochemical layer.

However it is possible to electrically agitate the electrolyte at the diffuse zone by changing the current from the electrodes to the electrolyte, i.e. by overlaying an alternating current over the direct current in the regular electroplating process. For such purposes the doble-layer capacitor is used as a means to inject an alternating electric current, using the electric polarization phenomenon. The metal plate of this capacitor (the electrode) stands high surface charge variations, as it is a conductive metal. On the contrary, the electrical charge variations in the non metal plate of this capacitor will obviously generate variations in the ions distribution into the diffuse layer, as the ions take some physical room inside the solution, i.e. overlaying an alternating current causes ions movement in the vicinity of the electrode-electrolyte interface. Thereby an actual "hydraulic pump" is generated aimed to move ions into the vicinity of the electrode. Mechanical agitation methods cannot reach this spot, as the solution viscosity prevents such scenario (FIG. 5).

It is important to highlight that, if this agitation is made at a high enough frequency, the double layer capacitor shall endure significant charge variations with no high tension variations, as it has a quite high capacitance. Thereby, the phenomenon to transform copper ions in solution into copper atoms, integrated into the metal crystal structure, occurs just as in the classic process, but with a significant quality improvement on transportation phenomena in the vicinity of the electrode towards the solution.

The right frequency for interface agitation with overlaying of an alternating current onto the current used in the regular process is determined by testing methods of impedance spectroscopy, thus obtaining frequencies higher than 5 [Khz] (FIG. 6). At lower frequencies there is a risk to interfere the performance of the direct current source (i.e. the rectifier transformer) and with the electrochemical deposition process.

As a summary, the technical problem to be solved is how to implement a process to overlay a high-frequency alternating current over the direct current for EW/ER processes in industrial electrolytic cells.

STATE OF THE ART

Currently, nearly all strategies aimed to implement overlaying an alternating current over a direct current have been restricted to connect an alternating current source in parallel to the direct current source, using the same tie in. Thereby, the alternating current source is exposed to continuous tension generated by the direct current source. On the other hand, the direct current source is exposed to high frequency components generated by the alternating current source. Apart from this, the various proposals are source variations/connecting busbar variations/cells structure variations and/or a mixture of all the aforementioned, just as shown in FIG. 7.

As a comment Groole's invention, U.S. Pat. No. 2,026, 466 from 1935, is a charge regulator so that power consumption from the primary power supply is almost constant. The process/device alters current features feeding the charge, but it does not regulate power. This invention fits the category shown in FIG. 7.c, even though, at that time solid state rectifiers transformers did not exist.

In Lewis invention, US 2004/0211677 A1 from 2004, just as shown in FIG. 7.b a new source is proposed. All process flow circulates through this source i.e. direct current/alternating current.

Mathews' invention US 2007/0272546 A1 involves changing and discarding the currently operational direct currents sources; to change and discard all the bus bars connecting between the direct current source and the electrolytic cells; and, changing and discarding all the structure of present electrolytic cells. This entire array must be replaced by new equipment which is not standardized for the industrial production.

In our invention, just as described in the application INAPI 0817-2007, our proposal is to include a device aimed to remove, accumulate and return power from the group of electrolytic cells in a consecutive manner, just a shown in FIG. 7.d. Thereby, the alternating current that is superimposed onto the direct current is generated; therefore, there is no need to modify the original facility. This application was authorized in Chile, Australia, South Africa and USA. In the USA it was divided into two patents. One of these patents claims the process aimed to generate alternating current by removing, accumulating and consecutive return. The other patent claims the device performing the various stages of the process. Both patents were approved. In this case, the alternating current source is also in parallel with the direct current source or rectifier.

In Lagos' invention, application INAPI 0969-2009, the proposal is two possibilities to implement two versions of similar devices whose philosophy is similar to the one proposed in the application 0817-2007, but not including accumulation capacitors, as this invention claims that the function of these capacitors can be replaced by groups or subgroups of electrolytic cells. In our opinion, this strategy cannot be applied at an industry level. Because of the size of the industrial electrolytic plants, the connecting leads would have an inductance that is not compatible with the operation of devices as IGBT transistors, just as shown in FIGS. 7.e and 7.f, representative components of this application.

For the first time our invention, application INAPI 3315-2013, proposes to change the tie in of the alternating current source by a different one where the direct current source is connected to. Our proposal is that the tie in of the alternating current source is a no electrical tension spot between any two consecutive cells of those electrically connected in series. Specifically, the perfect tie in proposed is between the intermediate cells of any typical circuit of ER/EW cells. The inclusion of an alternating source must be along with the inclusion of two passive components, namely: an inductor and a capacitor, which allow circulation of direct current/alternating current (FIG. 7.g).

When analyzing the State of the Art, we can see that all proposals consist of implementing just one big alternating current source for the group of cells connected in series, just like the direct current source. Thereby, the solutions tend to use the same tie in used by the direct current source for connecting the alternating current source. The only invention that is different is ours, as our previous application, INAPI 3315-2013, also proposed a big source for alternating current for the whole pack of cells, but unlike the others, the tie in is made between two of any consecutive cells, and that is not the tie in of the direct current source.

Proposed Solution

The solution proposed in this application consists of making the high-frequency alternating current circulate between the end electrodes of each electrolytic cell, from the first to the last electrode, and from each electrode to the next one, through the electrolyte contained between the electrodes; while simultaneously, the direct current circulates in parallel, from the anodes to the cathodes, through the electrolyte contained between the electrodes, whether for electrowinning/electrorefining processes aimed to produce copper and other metals (FIG. 8)

Unlike all the other previous solutions/inventions this application proposes to implement several small sources of alternating current, instead of just one big alternating current source. The tie in chosen for the sources, i.e. the outer/end electrodes for each cell actually have no tension, so the alternating current source may be a standard design, specially for the sources aimed to generate alternating current for induction heating.

In case of installing an alternating current source for two cells, it is enough to install and connect a capacitor among the cells. Thereby, the capacitor shall allow circulation of alternating current and at the same time keeping a tension equivalent to the difference of tension between the last electrode of the first connected cell and the first electrode of the second cell connected (FIG. 1). In a more general example, when an alternating current source is installed to feed several cells, it is enough with installing a capacitor between each pair of cells. As the electrolytic cells are also coupled to a high direct current circuit having a high amount of energy accumulated, it is convenient and necessary in these cases that both the alternating current source, and also the capacitor(s) are equipped with over current and/or short circuit protection, whether fuses/thermomagnetic protection (FIG. 9).

When exploring the idea of installing an alternating current source for individual cells, our first though would be to connect them directly onto the barras among the cells to which the terminals of the electrodes are connected and through which the direct current circulates: However, this would involve to design an alternating current source, whose current capacity should be equivalent to the two faces of all the electrodes inside the cell. As a general example, a regular EW plant has cells aimed to manufacture 60 cathodes with two faces, each of them is one square meter; i.e. the surface of each cell is 120 [$m^2$]. If production is made at 300 [$A/m^2$], then, the total current needed is about 36 [KA]. From an economic point of view this scenario makes impossible to connect one source per cell to the direct current terminals, and also because there is no room enough at production plants to install such big power sources.

The solution proposed by this invention consists of installing alternating current sources whose current capacity is equivalent to the current capacity of one face of one electrode, and to connect them at the outer/end electrodes of the circuit cells to which an alternating current overlaying over the direct current is to be applied. Thereby and making reference to the example described in the herein above paragraph, the alternating current sources connected in the 60-cathode cells must have a capacity of 300 [A], instead of 36 [KA]. This scenario makes feasible, from both an economic/geometrical point of view to install small alternating current sources, and even one alternating current source per cell. In fact, a 300 [A] alternating current source is a very small electrical piece of equipment.

ADVANTAGES FOR INDUSTRIAL APPLICATION OF THIS INVENTION

From a practical point of view the solution proposed in this invention is compatible with the short-circuiting frames usually used for removing residues, maintaining and repairing electrolytic cells. In order to put thin invention into practice it is only necessary to stop the alternating current source in the cells intervened by the short-circuiting frame. With other previous inventions/solutions it is necessary to re design the short-circuiting frames to make them fit to transmit high frequency alternating current, or otherwise to interrupt the alternating current overlaying in the whole set of cells.

During the sowing/harvesting process of cathodes it is possible to stop the alternating current source so that the first copper layer is more porous and fit for stripping copper sheets from the stainless steel cathodes. Stopping the alternating current source shall be subject to evaluation during the plant operation, in order to optimize the methodology and down time.

The cost to implement this alternating current overlaying technology is proportional to the amount of cells this invention is applied on. In general, the implementation shall be proportional to the production. Therefore, in case of plants with a smaller amount of cells, the implementation cost shall be less. It is important to highlight that the current capacity of the alternating current source of one cell shall be the current capacity of one face of one electrode; therefore, implementing this invention requires a small/cheap/easy to install piece of equipment. The technical difficulty for implementing this invention is very low, as in the market there are cheap/ready to install electronic power packs.

From a practical point of view, and according to the aforementioned in the herein above paragraph, the solution claimed in this invention does not use the original power transmission bars circuit of the system; therefore, there shall be losses neither in conductors nor in contacts; and therefore there shall be no extra heating caused by the alternating current transmission onto the direct current bars system. The only current connection shall be made on the two outer electrodes of the cell. These joints may be bolted; therefore the contacts shall be much safer and with a low resistance.

As the direct current bars system shall not be used for transmitting alternating current, it is possible to implement the solution, in such a way as to deliver alternating current intensity much higher than using the direct current bars system, thus getting the benefits by reducing cells tension. In this case, the implementation of alternating sources current as parallel resonance sources seems to be specially fit. Thereby, instead of applying 300 [A/m2] alternating current, it is possible to apply much higher alternating current, by electrically agitating the electrolyte in the diffuse layer of the electrodes vicinity, thus spreading the high concentration of ions (mainly protons), reducing the electric field and reducing the tendency to the dielectric breakdown of the Helmholtz layer, thus reducing the preferential growth tendency of the copper deposits, improving the quality and reducing cells tension and power consumption of the process. This is how the business shall obtain a higher margin, by improving quality and reducing power consumption of the process, with no further need to re design/change the standard of electrodes, cells, rectifier or any other component of the system.

The alternating current source can be implemented with any technology of those available. The operation frequency of this source must be higher than 5 [KHz]. The current intensity generated by this alternating current source shall be linked to the intensity value of the direct current, as it does not make any sense to inject an alternating current when the direct current is very low or absent. Besides, the EW & ER processes only make sense when there is direct current circulating.

Regarding industrial implementation view, the technology proposed in this invention, can be implemented with a minimum impact on the plant operation originally operating with an EW/regular ER process, as the installation of components may be executed nearly with no interruptions on the regular operation of the plant.

Regarding system components, it is not necessary to modify/to replace any of the components from the original system: the direct current source (i.e. the rectifier transformer) remains exactly the same and its operation is not altered, once the alternating current sources start to operate. Neither the structure of the electrolytic cells nor the installation or operation of the new alternating current source is modified.

FIGURES

FIG. 1: Diagram of the proposed invention: an alternating current source with fuse protection is installed and connected to a couple of cells. In these cells alternating current shall be superimposed onto the direct current, already applied by the direct current source.

A fuse protection capacitor bearing the tension difference among the cells is installed and connected. This piece, in turn, is used as a path for the alternating current.

FIG. 2: Scenario where electrowinning/electrorefining processes for copper and other metals is performed: direct current is transmitted to the electrolytic bay. Direct current source is a rectifier transformer.

FIG. 3: (1) shows a cathode (2) a regular-design anode (3) and a diagram of a typical industrial electrolytic cell.

FIG. 4: Electric Model of the Helmholtz layer, acting as a parallel capacitor with a resistive component, modeling the power consumption necessary for transforming ions in solution into atoms in a metal crystal structure. The components are as follows: (a) the inner area of the metal electrode; (b) the inner layer or Helmholtz layer, modeled as a capacitors bank and a resistive component, representing the power consumption for transforming ions dissolved in a solution into atoms in the metal crystal structure; (c) the diffuse layer and (d) the solution core.

FIG. 5: A hydraulic pump generated when superimposing alternating current onto direct current of the classic model: a charge variation in the electrode metal plate makes the ions move into the solution, in a perpendicular direction to the surface of the electrode. The components spotted are as follows: (a) the inner area of the metal electrode whose surface accumulates charge in a minimum width space, as it is a conductive metal; (b) the inner layer or Helmholtz layer, modeled as a capacitors bank and a resistive component, representing power consumption for transforming ions dissolved in a solution into atoms in the metal crystal structure; (c) the diffuse layer where agitation of the ions in solution occurs, in the direction of the electric field imposed by the superimposed current and (d) the solution core.

FIG. 6: Nyquist's Diagram and Bode's Diagram, resulting from the spectroscopy impedance test aimed to determine performance of the cathode interface impedance. It is observed that above [5 KHz], the process behaves as electric polarization, i.e., for the alternating electric current to go through, impedance is merely capacitive.

FIG. 7: Alternative implementation schemes for superimposing alternating current onto direct current: (a) that is the original scenario of regular EW Plants; (b) that is an implementation where the original direct current source is changed by another totally new one capable to generate superimposed current; (c) that is an implementation where a new source is inserted which modifies the original current, superimposing high frequency current; therefore, it is necessary to modify the original bus bars by another one receptive to the high frequency of alternating current; (d) that is an implementation of a current generating process with further stages of subtraction, accumulation and return; (e) and (f), representing implementations similar to those shown in letter d, but replacing the power accumulation capacitors by subgroups of electrolytic cells; (g) that is an invention where the tie in of the alternating current source is changed.

FIG. 8: Diagram of the proposed invention for a cell: an alternating current source is installed and connected to a cell, to which an alternating current is superimposed onto the direct current, already applied by the direct current source.

FIG. 9: Diagram of the proposed invention for several cells: an alternating current source is installed and connected, with fuse protection for several cells, to which an alternating current is superimposed onto the direct current, already applied. Fuse-protected capacitors are installed and connected, aimed to bear the tension difference among the cells, which, in turn, are used as a path for the alternating current.

The invention claimed is:

1. A system to superimpose alternating current onto direct current circulating in an electrolytic cell, for refining metals, the system comprising:
   a plurality of electrodes including at least one anode and at least one cathode as well as a first electrode and a last electrode of the electrolytic cell configured to receive a direct current for refining a metal; and
   an alternating current source with terminals connected to the first electrode and the last electrode of the electrolytic cell so that an alternating current can circulate in series from the first electrode to the last electrode and from each electrode of the plurality of electrodes to the next through an electrolyte contained among the electrodes while the direct current circulates in parallel with the alternating current from the at least one anode to the at least one cathode through the electrolyte.

2. A system according to claim 1, wherein the first electrode and the second electrode are anodes.

3. A system according to claim 1, wherein the first electrode and the second electrode are cathodes.

4. A system according to claim 1, wherein the electrolytic cell is configured to refine copper.

5. A system for superimposing alternating current onto direct current circulating in two consecutive electrolytic cells with electrodes, connected in series to refine metal, the system comprising:
   an alternating current source with fuse protection in series connected to a first electrode of a first cell and a last electrode of a second cell; and
   a capacitor with fuse protection in series connected to a last electrode of the first cell and a first electrode of the second cell;
   wherein inside each of the two consecutive electrolytic cells, the alternating current circulates, in series from the first to the last electrode and from one electrode to the next one, through an electrolyte contained among the electrodes, in each of the two consecutive electrolytic cells; while, simultaneously, the direct current circulates in parallel, from anodes to cathodes, through the electrolyte contained among the electrodes in each of the two consecutive electrolytic cells; and, in turn, the alternating current circulates through the capacitor whose electric voltage is equal to a difference of tension between the last electrode of the first cell and the first electrode of the second cell.

6. A system according to claim 5, wherein the last electrode of the first cell and the first electrode of the second cell are anodes.

7. A system according to claim 5, wherein the last electrode of the first cell and the first electrode of the second cell are cathodes.

8. A system according to claim 5, wherein the two consecutive electrolytic cells are configured to refine copper.

9. The system of claim 5, wherein the fuse protection for the alternating current source comprises thermomagnetic protection.

10. The system of claim 5, wherein the fuse protection for the capacitor comprises thermomagnetic protection.

* * * * *